April 20, 1954  D. H. MALLINSON ET AL  2,675,673
GAS TURBINE POWER PLANT

Filed Oct. 24, 1949  3 Sheets-Sheet 1

Dennis H. Mallinson
William G. C. Lewis
Inventors

By Stevens, Davis, Miller & Mosher
their Attorneys

April 20, 1954   D. H. MALLINSON ET AL   2,675,673
GAS TURBINE POWER PLANT
Filed Oct. 24, 1949   3 Sheets-Sheet 2
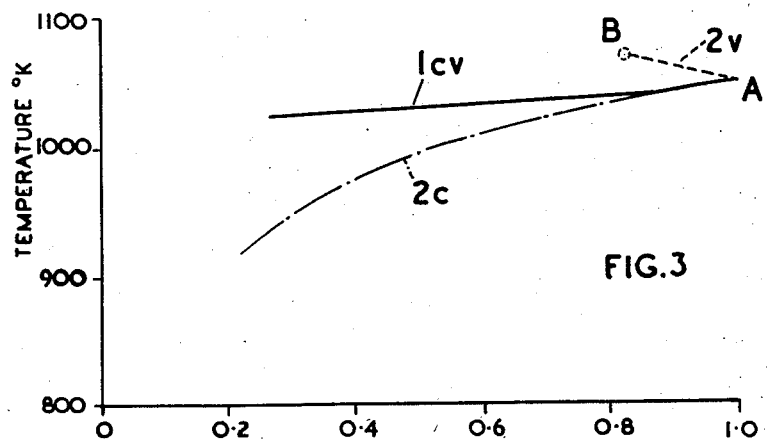
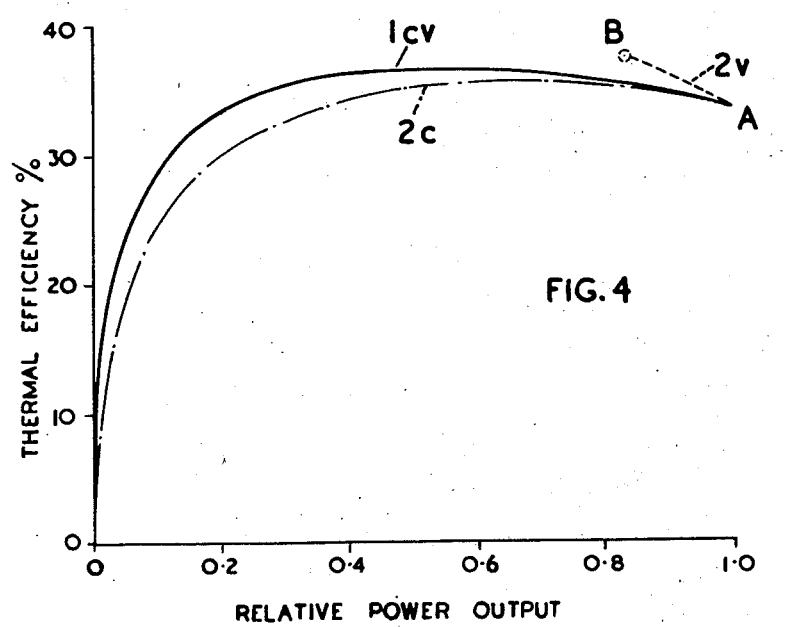

April 20, 1954    D. H. MALLINSON ET AL    2,675,673
GAS TURBINE POWER PLANT
Filed Oct. 24, 1949    3 Sheets-Sheet 3

INVENTORS
DENNIS H. MALLINSON AND
WILLIAM GERALD ERIC LEWIS
BY Stevens, Davis, Miller & Mosher
ATTORNEYS Patented Apr. 20, 1954

2,675,673

UNITED STATES PATENT OFFICE 2,675,673

GAS TURBINE POWER PLANT

Dennis H. Mallinson, Fleet, and William G. E. Lewis, Farnborough, England, assignors to Power Jets (Research and Development) Limited, London, England, a British company Application October 24, 1949, Serial No. 123,162

Claims priority, application Great Britain November 2, 1948

3 Claims. (Cl. 60—39.16)

This invention relates to a gas turbine plant of the kind which supplies power to a shaft, and is concerned, in particular, with improving the performance of such plant of this kind as is required to produce widely varying power outputs at widely varying shaft speeds, but also provides for an improved performance in plant of this kind which is required to produce widely varying power at a constant shaft speed.

It is common, in a gas turbine power plant, to provide a heat exchanger to transfer heat from the working fluid after expansion to that working fluid which is about to be heated by combustion of fuel, so conserving heat which would otherwise be rejected. Thus, considered purely from the theoretical aspect, the maximum temperature of the operating cycle of a plant having a heat exchanger may be raised indefinitely to give higher plant efficiencies, whereas, to raise the maximum cycle temperature of a plant having no heat exchanger may result in poorer efficiencies, since a proportionately greater amount of heat may be rejected in the expanded working fluid at a higher maximum cycle temperature than at a lower maximum cycle temperature. In either case a practical limitation is imposed on the maximum cycle temperature by the ability of the material of the turbine blades to withstand such temperature. It may, therefore, be stated, for gas turbine power plant having adequate provision for heat exchange generally (but, for plant having no heat exchange, only in comparatively exceptional cases, unless alternative means for promoting heat conservation are provided), that the maximum cycle temperature should desirably be maintained, at all power outputs, substantially constant at a value close to the maximum temperature which the turbine blades can withstand, since a deviation from this condition at any power output within the required range, would result, in the case of a decreased maximum cycle temperature, in a loss in efficiency at that power, and in the case of an increased maximum cycle temperature, in damage to the turbine blading; in either case, therefore, the effect is detrimental to the performance of the plant.

However, among the known arrangements of gas turbine power plant, whose performance would benefit by the satisfaction of the foregoing condition, many exhibit a tendency, when their power output is decreased progressively from its optimum value, to a progressively increasing, or decreasing maximum cycle temperature.

This characteristic is attributable to the requirement, usual in all normal applications, for a definite relationship between the power output and the shaft speed as imposed by the nature of the load, but is also inherent in the arrangement of the components of the plant. Moreover, in many cases, the plant is incapable of producing widely varying loads as the imposed speed limitations, together with the plant arrangement, are such as to cause instability in the flow of the working fluid in the components of the plant. In isolated cases however, the particular speed to power output relationship imposed on a plant may be favourable in that the maximum cycle temperature at varying power outputs does not vary greatly throughout a useful power range.

One such example occurs in the case of a known plant arrangement (to be described hereinafter) when operating to produce varying powers at a constant shaft speed; the maximum cycle temperature, however, even in this case, falls to some extent with decreasing power output, and the known plant arrangement does not therefore, constitute the best possible for the speed to power output relationship imposed. In cases where a power output to speed relationship of a different nature is required (as, for example, in the application of gas turbine plant to marine propulsion), even less success has been achieved, and known plant arrangements have, in general, power output ranges under these conditions which are severely limited.

Proposed methods for the solution of the difficulties imposed by such a requirement have included that of interposing electrical or fluid couplings between the plant and its load to effect torque and speed conversion; this expedient is obviously to be avoided if possible.

The invention has for an object, to provide an arrangement for a gas turbine power plant which is capable of producing widely varying power outputs at widely varying or constant speeds whilst maintaining stability of fluid flow and a substantially constant maximum cycle temperature throughout the power range.

In considering a possible arrangement for the improved plant it will readily be appreciated that, in order to avoid speed limitations imposed by the load being reflected in compressor performances, the output power-producing turbine stages should desirably be rotationally independent of the compressor-driving turbine stages.

A less obvious consideration, however, from the realisation of which the invention springs, is that the maximum cycle temperature characteristic of any gas turbine power plant at varying power outputs is influenced in a particular manner by the relationship between the pressure range of the output power-producing turbine stages and the pressure range of the compressor-driving turbine stages.

If, for example, a turbine system be considered in which two or more stages arranged in series with respect to fluid flow are designed to accommodate a given overall pressure or heat drop, each stage being arranged to accommodate a predetermined proportion of that pressure drop, it is found, when the system operates at a lower overall pressure or heat drop than that for which it is designed, that a disproportionate adjustment occurs in the pressure drop accommodated by each stage, the effect in general being that the proportion of the total pressure drop accommodated by the higher pressure stages increases while the proportion accommodated at the lower pressure stages decreases with decreasing overall pressure drop with a corresponding redistribution of the overall heat drop.

Further, if such a turbine system be designed as part of a plant in which any one, or combination of the turbine stages supplies the work for compression, it follows that, in order to produce from the compressor-driving stages a power output which bears a given relationship to their designed power output (i. e. for a given part-load compressor turbine output) the overall heat drop required varies according to the range of the heat or pressure drop of the compressor-driving turbine stages in relation to the overall heat or pressure drop. Thus, if the work for compression is derived from the heat or pressure drop in the lower, or in the higher pressure turbine stages, its proportion of the overall heat drop will respectively decrease or increase with a decrease in that overall heat drop.

If two plants are now considered, each designed with the same total heat drop in the turbine stages for a supposed full-load power output and having a similar proportion of this heat drop devoted to compressor-driving turbine stages, at the high pressure end of the expansion in one case, and at the low pressure end of the expansion in the other, it will be apparent that, in order to produce an identical part-load power output from the compressor-driving turbine stages in each case, the part load overall heat drop required will be less in the first case than in the second. Or, if it be assumed that the two plants have a similar maximum cycle temperature at the full-load power output, the part-load maximum cycle temperature required in the first case will be lower than that required in the second case. It will be appreciated therefore that, between the two extremes represented by the two plants considered, an infinite number of plants may be postulated, each having similar full-load power outputs and corresponding maximum cycle temperature but differing in the location of their compressor-driving turbine stages with respect to the overall expansion and consequently requiring varying maximum cycle temperatures for a similar part-load compressor turbine power output. Now supposing that the range covered by these varying part-load maximum cycle temperatures includes the common full-load maximum cycle temperature, then, in one particular plant, the condition that the maximum cycle temperature be constant at both the full-load and at the given part-load, is satisfied. Further, if it be found that this condition is satisfied at any part-load (within a desired range) by that particular plant, then the latter would constitute the most favourable basis for the design of a practical plant arrangement of the kind under consideration.

In pursuing such a possibility, an investigation of a general nature of such plant based on the foregoing considerations has led to the conclusion that a plant in which turbine stages producing the useful external power are located near the high pressure end of the expansion will tend to have a rising maximum cycle temperature with decreasing power output, while a plant in which the output power-producing turbine stages are near the low pressure end of the expansion will tend to have a falling maximum cycle temperature with decreasing power output. In general it is found that the power-producing turbine stages should be toward the high pressure end of the expansion rather than the low pressure end in order that the maximum cycle temperature be maintained substantially constant at varying power outputs.

Accordingly the invention proposes a gas turbine plant supplying useful shaft power comprising both compressor-driving turbine stages and other turbine stages producing substantially the whole of the useful power output of the plant, in which the pressure drop of the working fluid in passing from the highest to the lowest pressure compressor-driving turbine stages is substantially the total pressure drop in the working fluid in the cycle of the plant, while the output power-producing turbine stages are arranged for rotation independently of the compressor-driving turbine stages and, in respect of the flow of working fluid, are in parallel or in intermediate series with certain of those stages such that they operate in a pressure range lying within and less than the pressure range of the compressor-driving stages and having its lower pressure limit above the lower pressure limit of the latter, and which is so selected as to permit operation of the plant at varying power output with varying or constant shaft speeds whilst having a substantially constant maximum cycle temperature. It will be understood that the term "lying within" includes the case when the respective pressure ranges are co-terminous at their upper limits.

The invention may be considered to be of particular interest in its application to a plant having a heat exchanger, but it may also be applied, in appropriate cases, to plant having means alternative to heat exchangers which conserve heat in a similar manner, or to plant having no such provision whatsoever.

Figures 3 and 4 are graphs on which comparative performance data of the plants of Figures 1 and 2 are plotted;

Figure 1:
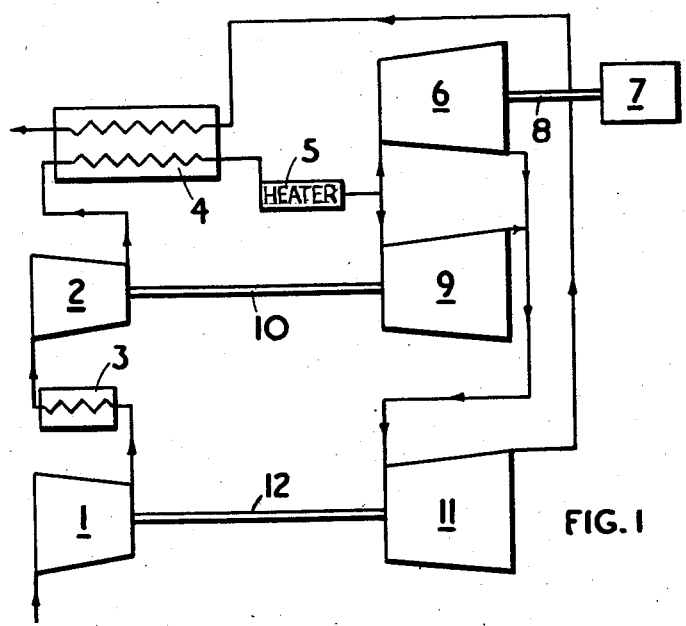
Figure 1 is a schematic view of a gas turbine power plant according to the present invention.

The embodiment shown in Figure 1 is preferred because it represents the most simple arrangement of components which will achieve the desired result. Air is inspired by the low pressure compressor 1 and passes therefrom to a high pressure compressor 2 by way of an inter-cooler 3 (optional). After leaving the high pressure compressor 2 the air passes through a heat exchanger 4 and to combustion apparatus 5 whence the products of combustion are divided into two streams one of which supplies a power turbine 6 which is coupled to the load 7 by the shaft 8 and the other passes to a turbine 9 which is coupled by a shaft 10 to the high pressure compressor 2. The gases, on leaving the output power turbine 6 and the high pressure compressor-driving turbine 9, are reunited and pass to a low pressure turbine 11 which is coupled by the shaft 12 to the low pressure compressor 1; the gases leaving the low pressure turbine pass before being exhausted through the heat exchanger 4 where some heat is imparted to combustion air.

Thus the output power turbine coincides, in respect of its pressure range, with the upper part of the compressor turbine pressure range, whilst being rotationally independent of the compressors.

Figure 2:
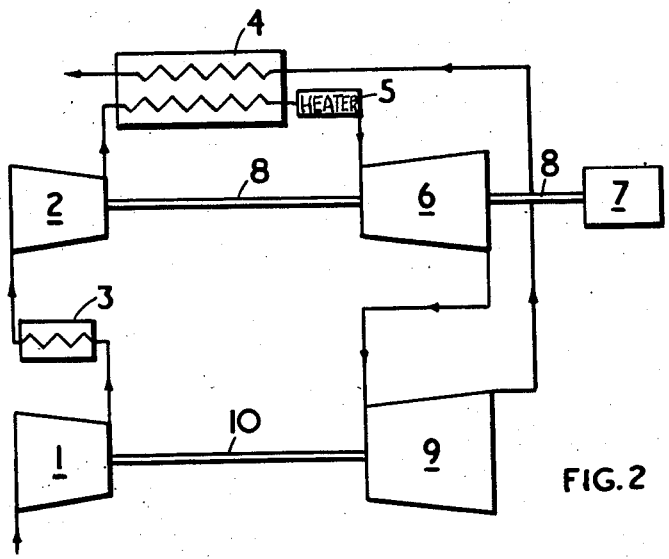
Figure 2 is a schematic view of a prior art gas turbine power plant.

In the known plant arrangement illustrated in Figure 2, air is inspired by a low pressure compressor 1 and passes therefrom to a high pressure compressor 2 by way of an inter-cooler 3 (optional). Thereafter the air passes through a heat exchanger 4 to a combustion chamber 5, the combustion products from which pass through a high pressure turbine 6 which drives through the shaft 8 both the high pressure compressor 2 and a load 7, and then through a low pressure turbine 9 which is coupled by the shaft to the low pressure compressor 1. The gases are finally exhausted through the heat exchanger 4. This plant arrangement, as has been remarked previously, is noteworthy for its performance when the high pressure rotor shaft 8 rotates at a constant speed at varying power outputs.

For the purpose of comparison, two plants have been considered, according to Figures 1 and 2 respectively, each being supposed to have an overall pressure ratio of 12:1 and a maximum cycle temperature of 1050° K. at the design condition. The performance of each plant has been considered when driving a varying load, in one case at constant speed, and in another case where the speed is related to the load by a "propeller law." Figure 3 shows the curves of maximum temperature in degrees Kelvin (ordinates) plotted against load (abscissa) and Figure 4 shows the curves of percentage thermal efficiency (ordinates) plotted against load (abscissa) for each plant at each condition; part-loads are in each case expressed as fractions of the full-load. In the case of the plant according to the invention (as in Figure 1) the curves for constant speed and propeller law operation coincide and are represented in Figures 3 and 4 by the full line curves marked $1cv$. From Figure 3 it is seen that the maximum temperature at all loads above 20 per cent. of full-load is very close to its value at the design point A; and from Figure 4 the thermal efficiency can be seen to be very high at all but the lightest loads. The performance of the plant according to Figure 2, when operating on the propeller law, is shown by dotted-line curves marked $2V$ in Figures 3 and 4. The maximum temperature rises rapidly with falling load, and the curve ceases at the point B, i. e. at approximately 80 per cent. full-load, due to compressor instability resulting from the imposed speed conditions; the thermal efficiency rises, of course, with the rising maximum temperature. When the same plant (Figure 2) operates at constant speed, the performance curves are considerably improved; as shown by the intermittent line curves in Figures 3 and 4 marked $2c$. The maximum temperature, however, falls quite rapidly from the value at the design point A; the resultant effect on the efficiency is also quite pronounced when compared with the curve $1cv$ for the plant according to the invention.

From the foregoing comparison it is apparent that the plant according to the invention, in addition to providing for good efficiencies at all useful loads when the speed is required to vary, also constitutes an improvement over known plant for constant speed applications, requiring for the purpose only that the power output turbine be provided with constant speed governing.

Although the plant as shown in Figure 1 is considered ideally suited to applications as diverse as marine propulsion and electricity generation, and, indeed, to most normal applications, it may, in some cases, be advantageous to use a plant substantially similar, but provided with separate combustion chambers to each of the power and high pressure compressor turbines, and/or a reheat combustion chamber immediately upstream of the low pressure compressor turbine.

Figure 5:
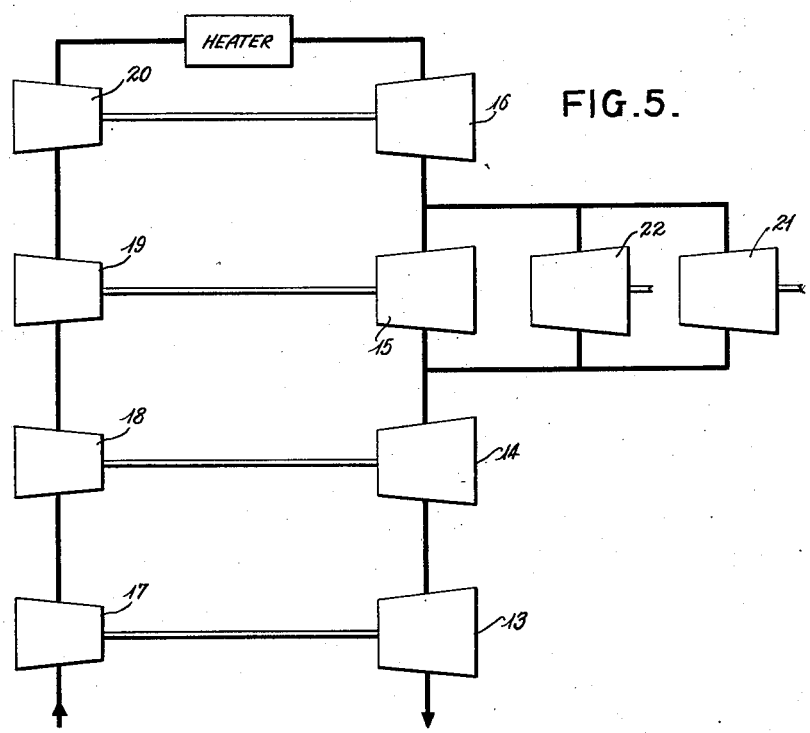
Figure 5 is a schematic view of a gas turbine plant according to the present invention in which there is a group of power turbines in parallel with a group of compressor turbines.

Other embodiments of the invention might include arrangements having four or more turbines 13, 14, 15 and 16, see Figure 5, with a correspondingly increased number of compressor stages 17, 18, 19 and 20 to allow greater selectivity in the location of the power turbine 21 or turbines 21 and 22 within the overall expansion, either in series (not shown) or in parallel, as shown, with compressor turbine stages 13, 14, 15 and 16.

Figure 6:
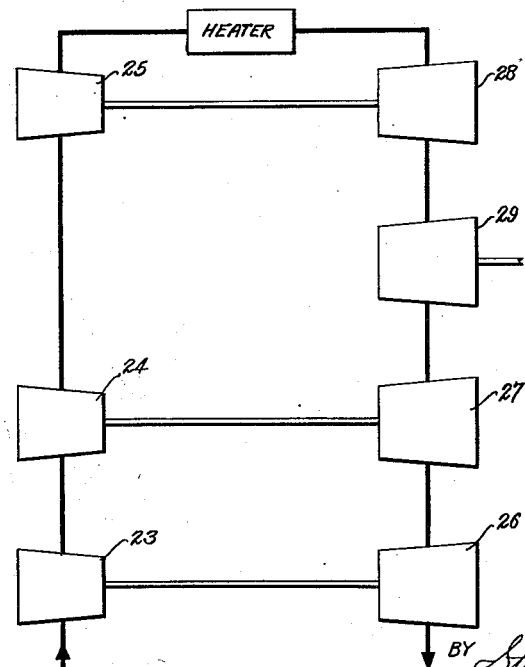
Figure 6 is a view similar to Figure 5 of a power plant in which the power turbine is in series with a group of compressor driving turbines.

In the embodiment of Figure 6 there are three compressor stages 23, 24 and 25 each driven by one of a corresponding number of turbine stages 26, 27, and 28, the high, intermediate and low pressure turbines driving respectively the high, intermediate and low pressure compressors, and a power turbine 29 in series with and situated between the high and intermediate pressure turbines. It is thought that such an embodiment could be designed to give a performance comparable with that of the preferred embodiment, of Figure 1, although, of course, its additional rotor makes it more complicated.

We claim:

1. A gas turbine power plant for supplying useful shaft power comprising compressors connected to receive air from atmosphere, a plurality of rotationally independent turbines in driving connection with said compressors, turbine means rotationally independent of said compressor-driving turbines and constituting the power-output turbine means from which substantially the whole useful power output of the plant may be drawn, and heating means connected to receive compressed air from the compressors and to supply hot gas as working fluid to said turbines and said turbine means, wherein said compressor-driving turbines include a plurality of turbines connected in series with respect to the flow of working fluid therethrough, the first of the series being connected directly to the said heating means and the last connected to exhaust to atmosphere, said output-power-producing turbine means being connected to exhaust through at least the last of said series and to receive working fluid at a point differing less in pressure from the maximum pressure in said series than the exhaust pressure of said outputpower-producing turbines means differs from atmospheric pressure.

2. A gas turbine power plant according to claim 1, wherein said output power producing turbine means is connected to receive working fluid directly from said heating means.

3. A gas turbine power plant comprising a low pressure compressor for compressing air from the atmosphere, a high pressure compressor rotationally independent of said low pressure compressor for receiving air from said low pressure compressor, heater means for receiving and heating air from said high pressure compressor, at least two rotationally independent high pressure turbines each connected directly to said heater means for receiving as working fluid the heated products therefrom of which high pressure turbines at least one is drivingly connected only to said high pressure compressor and another provided only the power output of the plant, and at least one low pressure turbine rotationally independent of said high pressure turbines and receiving substantially all the working fluid exhausted therefrom, said low pressure turbine being drivingly connected only to said low pressure compressor.

References Cited in the file of this patent

UNITED STATES PATENTS

| Number | Name | Date |
|---|---|---|
| 2,091,998 | Lysholm | Sept. 7, 1937 |
| 2,245,954 | Anxionnaz | June 17, 1941 |
| 2,280,765 | Anxionnaz et al. | Apr. 21, 1942 |
| 2,418,911 | Smith | Apr. 15, 1947 |
| 2,469,238 | Newton | May 3, 1949 |